(12) United States Patent
Lawrence et al.

(10) Patent No.: US 7,581,227 B1
(45) Date of Patent: Aug. 25, 2009

(54) SYSTEMS AND METHODS OF SYNCHRONIZING INDEXES

(75) Inventors: Stephen R. Lawrence, Mountain View, CA (US); Omar Habib Khan, Toronto (CA)

(73) Assignee: Google Inc., Mountain View, CA (US)

( * ) Notice: Subject to any disclaimer, the term of this patent is extended or adjusted under 35 U.S.C. 154(b) by 787 days.

(21) Appl. No.: 10/814,952

(22) Filed: Mar. 31, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. .................................................. 719/318
(58) Field of Classification Search ................... 719/318
See application file for complete search history.

(56) References Cited

U.S. PATENT DOCUMENTS

| 4,410,957 | A |   | 10/1983 | Cason et al. |
| 5,280,612 | A |   | 1/1994 | Lorie et al. |
| 5,321,838 | A |   | 6/1994 | Hensley et al. |
| 5,555,346 | A |   | 9/1996 | Gross et al. |
| 5,701,469 | A |   | 12/1997 | Brandli et al. |
| 5,742,816 | A |   | 4/1998 | Barr et al. |
| 5,748,954 | A |   | 5/1998 | Mauldin |
| 5,881,315 | A |   | 3/1999 | Cohen |
| 5,907,836 | A |   | 5/1999 | Sumita et al. |
| 5,956,722 | A |   | 9/1999 | Jacobson |
| 5,961,610 | A |   | 10/1999 | Kelly et al. |
| 5,964,839 | A |   | 10/1999 | Johnson et al. |
| 6,006,222 | A |   | 12/1999 | Culliss |
| 6,014,665 | A |   | 1/2000 | Culliss |
| 6,055,579 | A | * | 4/2000 | Goyal et al. ................. 713/375 |
| 6,073,130 | A |   | 6/2000 | Jacobson et al. |
| 6,078,916 | A |   | 6/2000 | Culliss |
| 6,119,147 | A |   | 9/2000 | Toomey et al. |
| 6,175,830 | B1 |  | 1/2001 | Maynard |

(Continued)

FOREIGN PATENT DOCUMENTS

WO    WO 02/069118    9/2002

OTHER PUBLICATIONS

U.S. Appl. No. 10/749,440, filed Dec. 31, 2003, Badros et al.

(Continued)

*Primary Examiner*—Meng-Ai An
*Assistant Examiner*—KimbleAnn Verdi
(74) *Attorney, Agent, or Firm*—Fenwick & West LLP

(57) ABSTRACT

Systems and methods that synchronize indexes are described. In one embodiment, a first index on a first client can be provided, wherein the first index comprises a plurality of terms associated with a plurality of events, the events comprising client activity associated with an article, and the first index can be synchronized with a second index or a second client by sending events from the first client to the second client, wherein the first and second indexes index the same events. In another embodiment, an event is retrieved from a first client, wherein the event comprises event data, the event is sent to a second client, the event is received by the second client as a new event, the new event comprising event data, a new event ID is associated with the new event, the new event ID is indexed, and the new event is stored.

28 Claims, 3 Drawing Sheets

U.S. PATENT DOCUMENTS

| | | | |
|---|---|---|---|
| 6,182,065 B1 | 1/2001 | Yeomans | |
| 6,182,068 B1 | 1/2001 | Culliss | |
| 6,199,067 B1 | 3/2001 | Geller | |
| 6,202,065 B1 | 3/2001 | Wills | |
| 6,209,000 B1 | 3/2001 | Klein et al. | |
| 6,226,630 B1 | 5/2001 | Bilmers | |
| 6,240,548 B1 | 5/2001 | Holzle et al. | |
| 6,275,820 B1 | 8/2001 | Navin-Chandra et al. | |
| 6,275,957 B1 | 8/2001 | Novik et al. | |
| 6,282,548 B1 | 8/2001 | Burner et al. | |
| 6,341,371 B1 | 1/2002 | Tandri | |
| 6,363,373 B1 | 3/2002 | Steinkraus | |
| 6,446,076 B1 | 9/2002 | Burkey et al. | |
| 6,477,585 B1 | 11/2002 | Cohen et al. | |
| 6,480,837 B1 | 11/2002 | Dutta | |
| 6,505,200 B1* | 1/2003 | Ims et al. | 707/8 |
| 6,513,036 B2 | 1/2003 | Fruensgaard et al. | |
| 6,526,405 B1 | 2/2003 | Mannila et al. | |
| 6,532,023 B1 | 3/2003 | Schumacher et al. | |
| 6,560,655 B1* | 5/2003 | Grambihler et al. | 709/248 |
| 6,581,056 B1 | 6/2003 | Rao | |
| 6,592,627 B1 | 7/2003 | Agrawal et al. | |
| 6,604,236 B1 | 8/2003 | Draper et al. | |
| 6,658,423 B1 | 12/2003 | Pugh et al. | |
| 6,681,247 B1 | 1/2004 | Payton | |
| 6,691,175 B1* | 2/2004 | Lodrige et al. | 719/314 |
| 6,728,763 B1 | 4/2004 | Chen | |
| 6,772,143 B2 | 8/2004 | Hung | |
| 6,779,030 B1 | 8/2004 | Dugan et al. | |
| 6,782,381 B2* | 8/2004 | Nelson et al. | 707/3 |
| 6,826,553 B1 | 11/2004 | DaCosta et al. | |
| 6,853,950 B1 | 2/2005 | O'Reilly et al. | |
| 6,859,800 B1* | 2/2005 | Roche et al. | 707/3 |
| 6,865,715 B2 | 3/2005 | Uchino et al. | |
| 6,877,027 B1* | 4/2005 | Spencer et al. | 709/205 |
| 6,907,577 B2 | 6/2005 | Tervo | |
| 6,934,740 B1 | 8/2005 | Lawande et al. | |
| 6,963,830 B1 | 11/2005 | Nakao | |
| 6,981,040 B1 | 12/2005 | Konig et al. | |
| 7,016,919 B2 | 3/2006 | Cotton et al. | |
| 7,080,073 B1 | 7/2006 | Jiang et al. | |
| 7,099,887 B2 | 8/2006 | Hoth et al. | |
| 7,162,473 B2* | 1/2007 | Dumais et al. | 707/5 |
| 7,330,536 B2 | 2/2008 | Claudatos et al. | |
| 7,331,049 B1* | 2/2008 | Jin | 719/314 |
| 7,457,872 B2* | 11/2008 | Aton et al. | 709/224 |
| 7,467,390 B2* | 12/2008 | Gilgen et al. | 719/318 |
| 7,475,406 B2* | 1/2009 | Banatwala et al. | 719/318 |
| 7,500,249 B2* | 3/2009 | Kampe et al. | 719/318 |
| 2001/0016852 A1 | 8/2001 | Peairs et al. | |
| 2002/0042789 A1* | 4/2002 | Michalewicz et al. | 707/3 |
| 2002/0049608 A1* | 4/2002 | Hartsell et al. | 705/1 |
| 2002/0059425 A1 | 5/2002 | Belfiore et al. | |
| 2002/0065802 A1 | 5/2002 | Uchiyama | |
| 2002/0073076 A1 | 6/2002 | Xu et al. | |
| 2002/0078256 A1* | 6/2002 | Gehman et al. | 709/318 |
| 2002/0091568 A1 | 7/2002 | Kraft et al. | |
| 2002/0091972 A1 | 7/2002 | Harris et al. | |
| 2002/0103664 A1* | 8/2002 | Olsson et al. | 705/1 |
| 2002/0116291 A1 | 8/2002 | Grasso et al. | |
| 2002/0138467 A1 | 9/2002 | Jacobson et al. | |
| 2002/0156760 A1* | 10/2002 | Lawrence et al. | 707/1 |
| 2002/0165903 A1 | 11/2002 | Zargham et al. | |
| 2002/0174101 A1 | 11/2002 | Fernley et al. | |
| 2002/0178383 A1 | 11/2002 | Hrabik et al. | |
| 2002/0184224 A1* | 12/2002 | Haff et al. | 707/10 |
| 2002/0188766 A1* | 12/2002 | Vuppula | 709/318 |
| 2003/0001854 A1 | 1/2003 | Jade et al. | |
| 2003/0018521 A1 | 1/2003 | Kraft et al. | |
| 2003/0028896 A1 | 2/2003 | Swart et al. | |
| 2003/0050909 A1 | 3/2003 | Preda et al. | |
| 2003/0055816 A1 | 3/2003 | Paine et al. | |
| 2003/0055828 A1* | 3/2003 | Koch et al. | 707/10 |
| 2003/0088433 A1 | 5/2003 | Young et al. | |
| 2003/0123442 A1 | 7/2003 | Drucker et al. | |
| 2003/0123443 A1 | 7/2003 | Anwar | |
| 2003/0130984 A1* | 7/2003 | Quinlan et al. | 707/1 |
| 2003/0131000 A1 | 7/2003 | Bates et al. | |
| 2003/0149694 A1 | 8/2003 | Ma et al. | |
| 2003/0154071 A1 | 8/2003 | Shreve | |
| 2003/0167266 A1 | 9/2003 | Saldanha et al. | |
| 2004/0003038 A1 | 1/2004 | Huang et al. | |
| 2004/0031027 A1 | 2/2004 | Hiltgen | |
| 2004/0095852 A1 | 5/2004 | Griner et al. | |
| 2004/0098609 A1 | 5/2004 | Bracewell et al. | |
| 2004/0128285 A1 | 7/2004 | Green et al. | |
| 2004/0133560 A1 | 7/2004 | Simske | |
| 2004/0133561 A1 | 7/2004 | Burke | |
| 2004/0143569 A1* | 7/2004 | Gross et al. | 707/3 |
| 2004/0187075 A1 | 9/2004 | Maxham et al. | |
| 2004/0193596 A1 | 9/2004 | Defelice et al. | |
| 2004/0215715 A1* | 10/2004 | Ehrich et al. | 709/203 |
| 2004/0254938 A1 | 12/2004 | Marcjan et al. | |
| 2004/0255301 A1 | 12/2004 | Turski et al. | |
| 2004/0267700 A1 | 12/2004 | Dumais et al. | |
| 2004/0267756 A1* | 12/2004 | Bayardo et al. | 707/10 |
| 2005/0021542 A1 | 1/2005 | Irle et al. | |
| 2005/0033803 A1* | 2/2005 | Vleet et al. | 709/203 |
| 2005/0060310 A1 | 3/2005 | Tong et al. | |
| 2005/0060719 A1 | 3/2005 | Gray et al. | |
| 2005/0076115 A1 | 4/2005 | Andrews et al. | |
| 2005/0114487 A1 | 5/2005 | Peng et al. | |
| 2005/0262073 A1 | 11/2005 | Reed et al. | |
| 2006/0167704 A1 | 7/2006 | Nicholls et al. | |
| 2007/0055689 A1 | 3/2007 | Rhoads et al. | |
| 2007/0208697 A1* | 9/2007 | Subramaniam et al. | 707/3 |

OTHER PUBLICATIONS 80-20 Software—Products—80-20 One Search, http://www.80-20.com/products/one-search/retriever.asp, printed Mar. 16, 2004.

"askSam™ Making Information Useful," askSam.—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalized the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-technologies.com/products/devonthink.php, printed Mar. 16, 2004.

dtSearch® —http://www.dtsearch.com/, printed Mar. 15, 2004.

Dumais, S., et al., "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Sofware—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *System Journal*, vol. 39, Nos. 3&4, 2000, pp. 685-704.

Rhodes, B., et al., "Remembrance Agent—A continuously running automated information retrieval system." *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market,"Red Herring—The Business of Technology, Mar. 9, 2004, http://redherring.com/PrintArticle.aspx?a=4782§or+Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921. pp. 1-3, printed Apr. 14, 2004.

"Standardization Priorities for the Directory—Directory Interoperability Forum White Paper," The Open Group, Dec. 2001, pp. 1-21.

Sullivan. D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

U.S. Appl. No. 10/814,773, filed Mar. 31, 2004, Lawrence et al.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

Knezevic, P. et al., "The Architecture Of The Obelix—An Improved Internet Search Engine," Proceedings on the $33^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/spectorcne_windows/help/v40/webhelp/>.

International Preliminary Report on Patentabiity, PCT/US2005/003386, Jun. 24, 2005, 8 pages.

International Search Report and Written Opinion, PCT/US2005/003386, Jun. 28, 2005.

International Search Report and Written Opinion, PCT/US2005/010985, Apr. 26, 2007, 9 pages.

International Search Report and Written Opinion, PCT/US2004/038562, Apr. 6, 2005.

Bengel, J., et al., "Archiving and Indexing Chat Utterances," Electrical Engineering and Computer-Science and Information Technology Telecommunications Center University of Kansas, 2003.

Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.

Pingali, G. S., et al., "Instantly Indexed Multimedia Databases of Real World Events," IEEE Transactions on Multimedia, Jun. 2002, pp. 269-282, vol. 4, Issue 2.

Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.

* cited by examiner

SYSTEMS AND METHODS OF SYNCHRONIZING INDEXES

FIELD OF THE INVENTION

The invention generally relates to search engines. More particularly, the invention relates to methods and systems for synchronizing indexes.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications can also need to rebuild the index at each batch processing or build new partial indexes and perform a merge operation that can use a lot of client-device resources. Moreover, conventional client-device search applications cannot efficiently index articles generated or accessed on multiple client devices. Thus if a user creates articles on a work computer and on a home computer, existing client-device search applications cannot efficiently create an index to include all the articles created by the user. For example, conventional client-device search applications can copy over the entire index on one computer to another computer. This method uses a great deal of the client-device resources and can affect the user's experience. Additionally, copying over an entire index from a first computer to a second may not preserve information in the index of the second computer that is not in the index of the first.

SUMMARY

Embodiments of the present invention comprise methods and systems for synchronizing indexes. In one embodiment, a first index on a first client can be provided, wherein the first index comprises a plurality of terms associated with a plurality of events, the events comprising client activity associated with an article, and the first index can be synchronized with a second index or a second client by sending events from the first client to the second client, wherein the first and second indexes index the same events.

Another exemplary embodiment comprises a computer readable medium comprising instructions, that, when executed, provide a first index, wherein the first index comprises a plurality of terms associated with a plurality of events, the events comprising client activity associated with an article, and synchronize the first index with a second index or a second client by sending events from the first client to the second client, wherein the first and second indexes index the same events.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
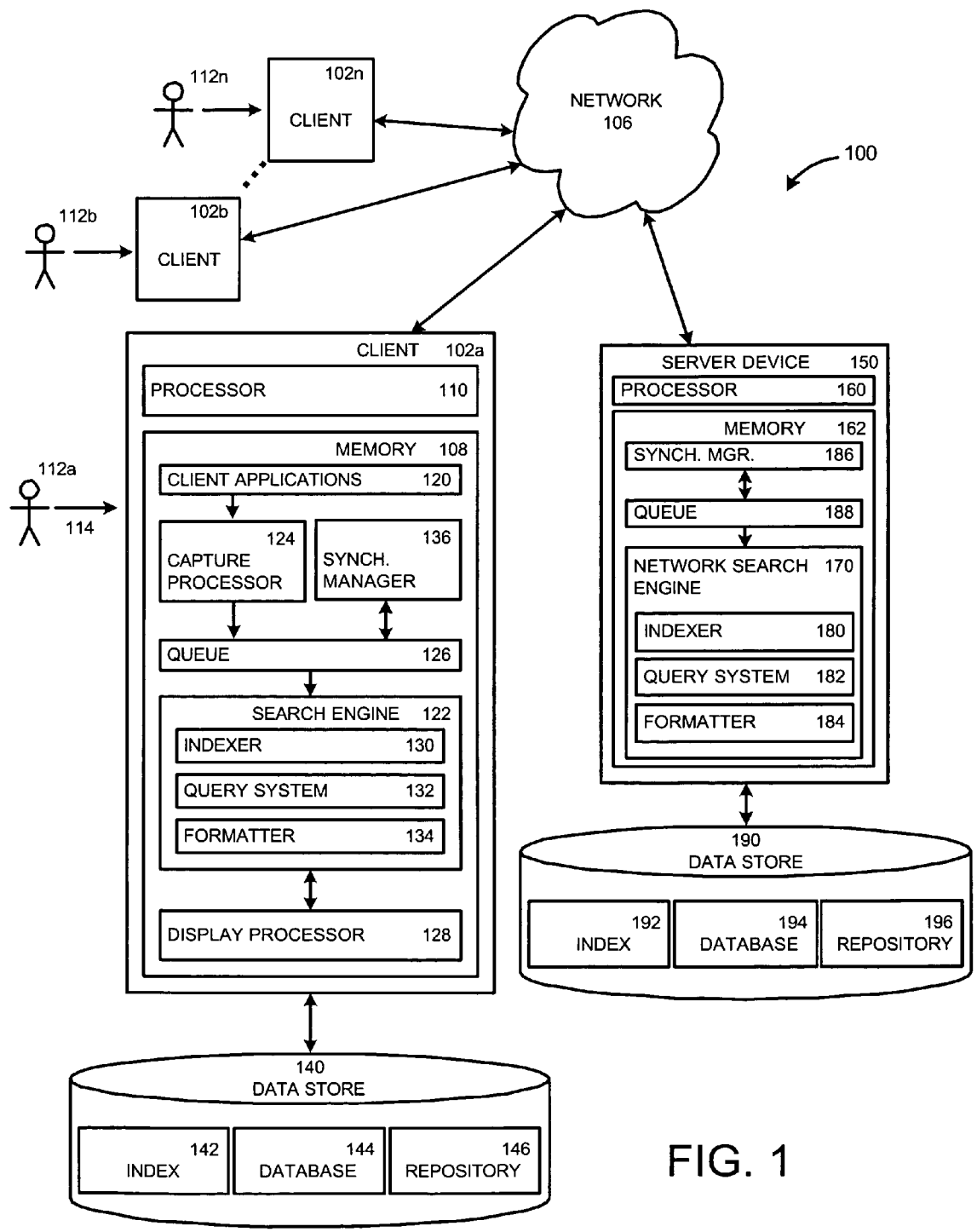
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown in FIG. 1 reflects a client-side search engine architecture embodiment, other embodiments are possible. The system 100 shown in FIG. 1 includes multiple client devices 102a-n that can communicate with a server device 150 over a network 106. The client devices 102a-n, server device 150, as well as other processor-based devices can be referred to generally as machines. The network 106 shown in FIG. 1 comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, VISUAL BASIC™, JAVA™, PYTHON™, PERL™, and JAVASCRIPT™.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content, files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contain a capture processor 124, a queue 126, and a search engine 122. The client device 102a can also contain or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include sending or receiving an email message, a user viewing a web page, saving a word processing document, printing a spreadsheet document, inputting text to compose or edit an email, opening a presentation application, closing an instant messenger application, entering a keystroke, moving the mouse, and hovering the mouse over a hyperlink. An example of event data captured by the capture processor 124 for an event involving the receipt of an email message by the user 112a can comprise the sender of the message, the recipients of the message, the time and date the message was received, and the content of the message. Event data for an event can also include location information associated with the location of the client device when the event occurred. Location information can include one or more of a local time, location coordinates, a geographical location, and/or a physical location. Location coordinates can include latitude and longitude coordinates and/or grid coordinates of the client device. The geographical location can include a city, state and/or country. The physical location can include the user's home, the user's office, and a particular location, such as, for example an airport or a restaurant.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprises a separate capture component that monitors overall network activity in order to capture event data associated with network activity, such as the receipt or sending of an instant messenger message. The capture processor 124 shown in FIG. 1 also can comprise a separate client device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client applications and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schemas can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an email message event received by the user 112a can include the sender, the recipient or list of recipients, the time sent, the date sent, and the content of the message. An event schema for a web page currently being viewed by a user can include the Uniform Resource Locator (URL) of the web page, the time being viewed, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired. An event schema can also contain location information as described above.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Non-indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as book marking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents, media files, presentation documents, calendar entries, and spreadsheet documents, the emails in a user's inbox, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In the embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed). The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple-priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor 124 to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

In the embodiment shown, the queue 126 can also receive events from the synchronization manager 136. The synchronization manager 136 can be used to receive events from the second client device 102b or the server device 150, or it can be used to send events to the second client device 102b or to the server device 150. Events received by the synchronization manager enter the queue 126 and are processed in the same manner as events from the capture processor 124. Events sent by the synchronization manager 136 can be events from the queue 126, from the data store 140, from the capture processor 124, or from some other component of the client 102a. In the illustrated embodiment, the events sent by the synchronization manager 136 are events from the queue 126. The events handled by the synchronization manager 136 comprise the same types of events processed by the capture processor 124, thus queued events from the capture processor 124 can be processed in substantially the same manner as queued events from the synchronization manager 136. According to some embodiments, a higher priority may be assigned to events from the capture processor 124.

The synchronization manager 136 can ensure that events initially captured on the client 102a are received by the client 102b or the server device 150 even if the events are not initially created on the client 102b or server device 150. Additionally, the synchronization manager can ensure that events initially captured on the client device 102b or server device 150 are received by the client 102a. For example, a user 112a can conduct activity on the client 102b while at work and then conduct different activity on the client 102a while at home. The synchronization manager 136 can receive from the client 102b events associated with the activity conducted while at work and send events to the client 102b associated with the activity conducted while at home. Thus, in this example, the events associated with the activity conducted while at work and the events associated with the activity conducted while at home will exist on both the client 102a at home and the client 102b at work.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may facilitate one or a combination of methods for storing data, including without limitation, arrays, hash tables, lists, and pairs, and may include compression and encryption. In the embodiment shown in FIG. 1, the data store comprises an index 142, a database 144 and a repository 146.

The data store 140 can comprise a local index. The local index in the embodiment shown in FIG. 1 may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client device 102a, or articles otherwise associated with the client user 102a or the client device 112a. The local index may be stored in a client machine, such as in data store 140, in a data store on a local network in a manner accessible by the client machine, on a server accessible to the client machine through the Internet, or in another accessible location.

In contrast, a global index comprises may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

In one embodiment, when the indexer 130 receives an event, the indexer 130 can determine, from the event, terms (if any) associated with the event, location information associated with the event (if available), the time of the event (if available), images (if any) associated with the event, and/or other information defining the event. The indexer 130 can also determine if the event relates to other events and associate the event with related events. For example, for a received email event, the indexer 130 can associate the email event with other message events from the same conversation or string. The emails from the same conversation can be associated with each other in a related events object, which can be stored in the data store 140.

The indexer 130 can send and incorporate the terms and location information, associated with the event in the index 142 of the data store 140. The event can be sent to the database 144 for storage and the content of the associated article and any associated images can be stored in the repository 146. The conversation object associated with email messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various applications to receive the results and display them in various formats. The display APIs can be implemented in various ways, including as, for example, DLL exports, COM interface, VISUAL BASIC™, JAVA™, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 comprises a synchronization manager 186, a queue 188 and a search engine application program also known as a network search engine 170. The synchronization manager 186 can receive events from the clients 102a-n over the network 106. Events received by the synchronization manager 186 can be sent to the queue 188, where they can be held until processed by the network search engine 170. The synchronization manager 186 can also retrieve events from the queue 188, the database 194, or another component of the server device 150. The retrieved events can be sent over the network 106 to the client 102a, the client 102b, or any other client on the network 106 adapted to receive the event.

The network search engine 170 can locate relevant information from the network 106 in response to a search query from a client device 102a. The search engine 170 can then provide the result set to the client device 102a via the network 106. The network search engine 170 also comprises an indexer 180, a query system 182, and a formatter 184. The indexer 180 receives events from the queue 188. When the indexer 180 receives an event, it can determine from an event schema, for example, terms associated with the event, the time of the event, images associated with the event, or any other information defining the event. The items and times associated with the event can be sent to and incorporated in an index 192 of a data store 190. The event can be sent to a database 194 within the data store 190. Content of an article associated with the event may be stored in a repository 196 with the data store 190.

The query system 182 can receive and process queries from the clients 102a-n on the network 106. Based on the query, the query 182 can locate relevant information in the data store 190 and provide a search result set. The formatter 184 can receive the search result set from the query system 182 and can format the results for output.

In one embodiment, the server device 150, or related device, has previously performed a crawl of the network 106 to locate articles, such as web pages, stored at other devices or systems coupled to the network 106, and indexed the articles in memory 162 or on another data storage device.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to explain the exemplary methods shown in FIGS. 2 through 3.

Various methods in accordance with the present invention may be carried out. For example, in one embodiment, a first index on a first client can be provided, wherein the first index comprises a plurality of terms associated with a plurality of events, the events comprising client activity associated with an article, and the first index can be synchronized with a second index or a second client by sending events from the first client to the second client, wherein the first and second indexes index the same events. In another embodiment, an event can be retrieved from a first client, wherein the event comprises event data, the event can be sent to a second client, the event can be received by the second client as a new event, the new event comprising event data, a new event ID can be associated with the new event, the new event ID can be indexed, and the new event can be stored.

Figure 2:
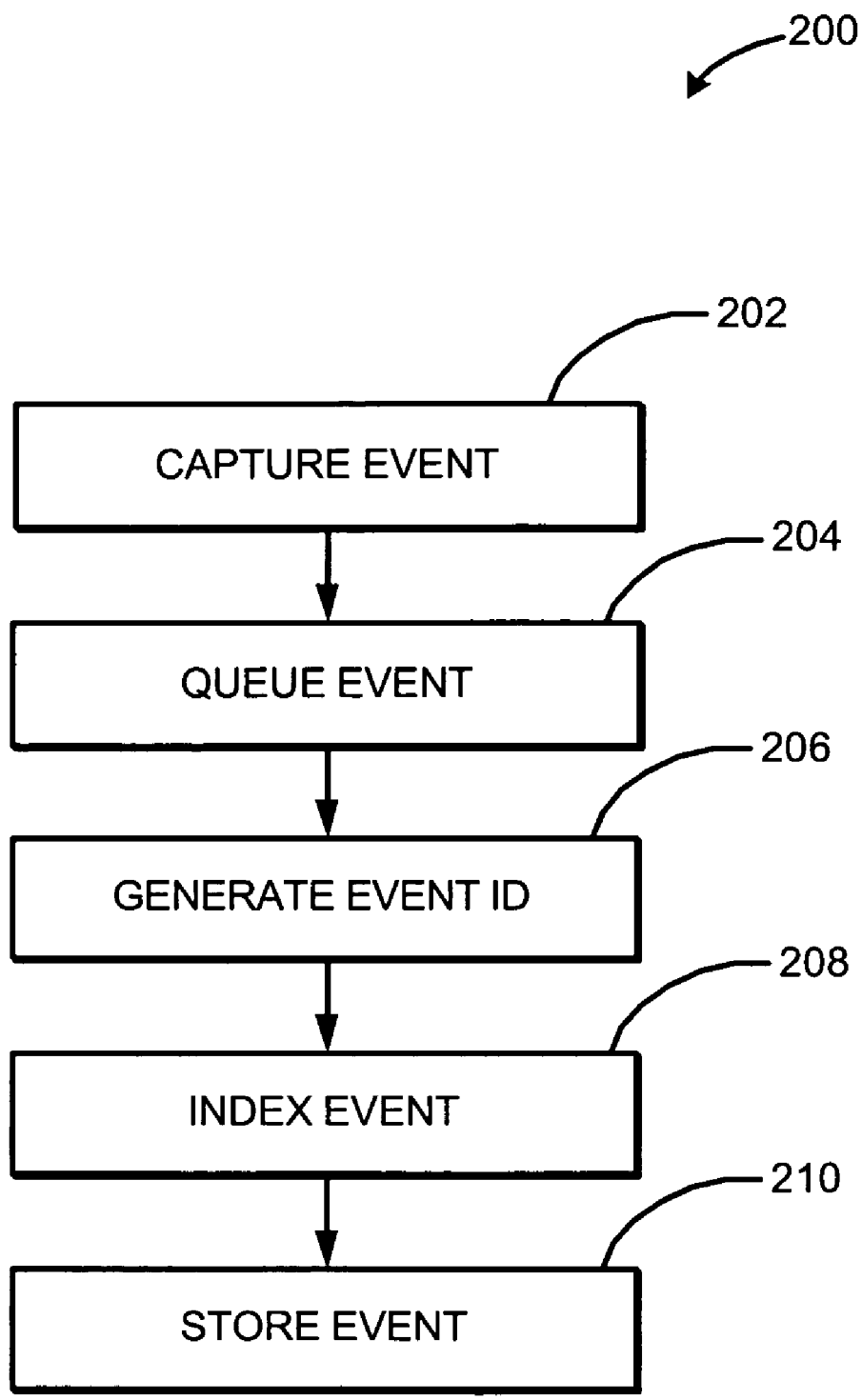
FIG. 2 illustrates a flow diagram of a method in accordance with one embodiment of the present invention.

FIG. 2 illustrates an exemplary method 200 that provides a method for capturing an event. For purposes of illustration, the method 200 will be described as occurring on the client 102a, though in practice the method 200 could be carried out on the server device 150, or any other device or combination of devices configured to capture an event. The method 200 begins with block 202, in which an event can be captured. In block 202, the event can be captured by the capturing processor 124. Examples of events that may be captured include viewing a web page, saving a word processing document, composing an email, printing a spreadsheet, sending an instant messaging message, or any other activity on client 102a.

Once the event is captured in block 202, it can be sent to the queue 126 in block 204. In block 204, the event can be queued until it is ready to be received by the indexer 130 within the search engine 122. In some embodiments, it is not necessary to send events to a queue 126. The embodiment depicted in FIG. 1 comprises the queue 126 to improve performance of the client 102a and prevent overuse of system resources. Thus, according to the embodiment depicted in FIG. 1 and the method 200 of FIG. 2, events are sent to the queue 126 to better regulate the processing of events by the search engine 122.

Block 204 is followed by block 206, in which an event ID can be generated for an event pulled from the queue 126. When an event is pulled from the queue 126, a check can be executed to determine whether an identical event already exists. If it does not, the indexer 130 will generate an event ID for the event. The event ID is a unique identifier associated with an event that can be used to reference the event in the index 142. Because the event ID can comprise much less memory space than the event with which it is associated, it is more efficiently stored in the index 142 and is more efficiently searched by the search engine 122 than the event with which it is associated. For example, the event captured in block 202 may comprise data relating to the title of an article, the time the article was edited, the location of the article, and text contained in the article. The event ID associated with this event in block 206 may comprise, for example, a single integer.

Block 206 is followed by block 208, in which the event captured in block 202 can be indexed. The event ID can be used in the index 142 to associate terms appearing in the event with the event. For example, suppose the event captured in block 202 contains a phrase "budget meeting" and that in block 206 the event ID that is associated with the event is a number "42." According to the method 200, in this example a term "budget" and a term "meeting" within the index 142 can each be referenced to the event ID "42." Thus, in this example, the event captured in block 202 that contains the phrase "budget meeting" will be associated with the term "budget" and the term "meeting" within the index 142 by way of the event ID "42" that was assigned in block 206.

Block 208 is followed by block 210 in which the event captured in block 202 is stored in the database 144 of the data store 140. The event stored in the database 144 during block 210 is associated with the event ID which allows the terms in the event to be indexed in the index 142 while the event itself is stored in the separate database 144. Other embodiments of the present invention could combine the index 142 and the database 144 or store the events in the index without the use of an event ID.

Figure 3:
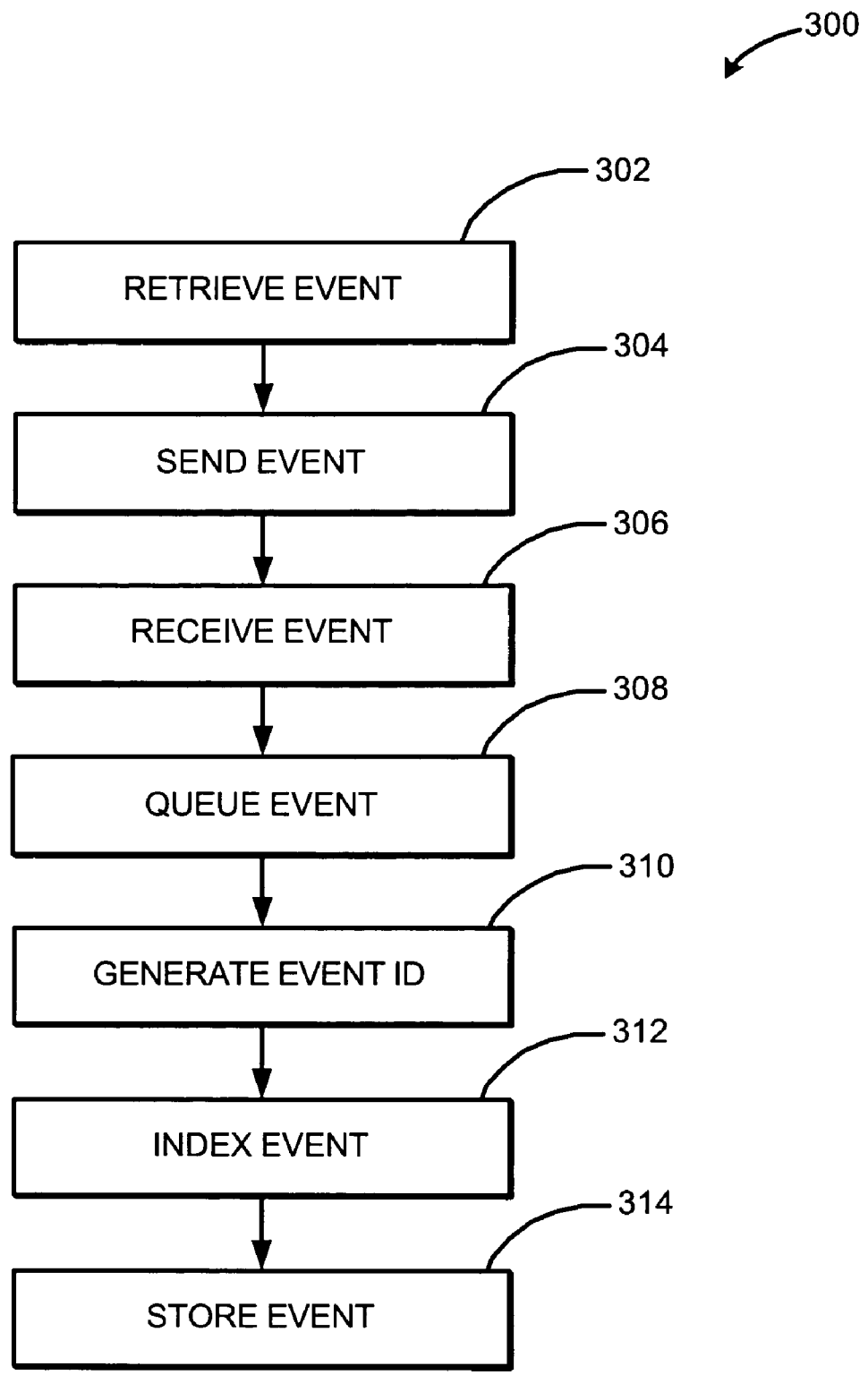
FIG. 3 illustrates a flow diagram of a second method in accordance with one embodiment of the present invention.

FIG. 3 illustrates an exemplary method 300 that provides a method for retrieving an event from a client 102a, sending the event over a network 106 to a server device 150, and indexing the event on the server device 150. While the method 300 is described as sending an event from a client 102a to a server device 150, the present invention includes sending an event from the server device 150 to a client 102a-n, from a client 102a-n to another client, or between any two systems configured to send or receive events.

The method 300 begins in block 302, in which an event can be retrieved by the synchronization manager 136 from the client 102a. The event may be retrieved from the queue 126, from the database 144 within the data store 140, or from any other component within client 102a. For purposes of illustration, FIG. 1 shows the synchronization manager 136 retrieving the event from the queue 126. The synchronization manager 136 can receive the event from the queue 126, for example, in response to a variety of triggering conditions. Triggering conditions can comprise, for example, periodic triggering, resource level triggering, manual triggering, event triggering, or any other suitable triggering methods. Periodic triggering can comprise a triggering method set to occur at certain intervals. For example, the synchronization manager 136 can be set to receive events every 10 seconds. Resource level triggering can comprise, for example, a triggering method set to occur when client, server, or network resource levels are sufficient. For example, the synchronization manager 136 can monitor client memory, server activity, network bandwidth, or any other relevant resource and receive events only when resources are determined to be above a desired level. Manual triggering can comprise, for example, triggering by the user 112a. For example, the user 112a can instruct the synchronization manager 136 to receive an event by entering a command line, clicking on a control, or by other suitable input method. Event triggering can comprise, for example, receiving events when an event occurs.

Block 302 is followed by block 304, in which the event retrieved in step 302 can be sent to the network 106 to be received by one or more of the clients 102b-n or the server device 150. The event may be sent over any connection between the client 102a and another system, but for illustration purposes in FIG. 1, the event is sent over a network connection to the network 106 and to the server device 150.

Block 304 is followed by block 306, in which the event sent in block 304 can be received by the synchronization manager 186. Accordingly, the event received by the synchronization manager 186 can be substantially the same as an event captured on the client 102a. The event can be processed, in the remaining steps of the method 300, in substantially the same manner as an event captured according to the step 202 of method 200 is processed in steps 204-210. For example, the event can be queued in step 308 in the same manner that the event in step 204 of FIG. 2 is queued.

In block 310, an event ID is generated for the event. In one embodiment, a check is executed to ensure the event is not a duplicate. The event ID generated in step 310 need not be the same as the event ID generated for the same event on the client 102a. Because the event IDs associated with same events on the server device 150 need not be the same as the event IDs for the same events on the client 102a, the index 192 generated on the service device 150 may not be identical to the index 142 on the client 102a. For example, if the user 112a looks at a web page and then sends an email while using the client 102a two events are captured on the client 102a. These events are processed according to the method 200, and each receives an event ID. The two events can then be sent, according to the method 300, to the server device 150. The events are received on the server device 150 just as if a user looked at a web page and sent an email on the server device 150. The two events are identical on both the client 102a and the server device 150. But the two events are not processed at the same time or by the same component, thus, the event IDs that the indexer 130 assigns to the event of looking at the web page and the event of sending the email can be different than the event IDs the indexer 180 assigns to the same event of looking at the web page and the event of sending the email.

Block 310 is followed by block 312, in which the event received in block 306 can be indexed. In step 310, the event ID associated with the event in block 310 can be associated with one or more terms, within a plurality of terms comprising the index 192, to which the event associated with the event ID relates. Thus, for example, if the event received in block 306 contained the phrase "budget meeting," and the event ID associated with the event received in block 306 is "73," the event ID "73" can be associated in the index 192 with a term "budget" and a term "meeting."

Block 312 is followed by block 314, in which the event received in block 306 is stored in the database 194 within the data store 190. According to the system 100 depicted in FIG. 1, the database 114 where the event is stored is distinct from the index 192. In other embodiments, the index 192 could contain with a plurality of terms associated directly with events instead of event IDs, and thus, the database 194 and the index 192 could be combined.

The index 192 need not be identical to the index 142 because the event ID associated with the event captured in block 202 of the method 200 may differ from the event ID associated with the event received in block 306 of the method 300 even when the event captured in block 202 is the same as the event received in block 306. For example, if the event captured in block 202 of the method 200 is the sending of an email comprising the terms "budget" and "meeting," it may be associated with an event ID "42." The same event comprising the sending of the email can then be received according to the method 300 and associated with an event ID, according to block 310. The event ID associated with the event in block 310 may be different than the event ID "42" associated with the event in block 206. It may, for example, be "73." Thus, in this example, the event comprising the sending of the email will be associated with the event ID "42" in the index 142 and with the event ID "73" in the index 192.

Thus, while the indexes 192 and 142 are not identical, because they comprise different event IDs, they do reference the same events. Because they reference the same events, the search engine 122 relying on the index 142 can return the same search results as the network search engine 170 relying on the index 192. The index 192 is therefore substantially the same as the index 142 because it references the same events even though it may do so by way of different event IDs.

Because the methods 200 and 300 enable the network search engine 170 to return the same search results as the search engine 122, according to certain embodiments, a user 112a can access the network search engine 170, via the network 106, from any device providing access to the network 106 and conduct a search that will yield the same results as if the user 112a executed the search on the client 102a. This enables a user 112a, for example, to search for articles created on a home computer while away from the home computer by accessing the network search engine 170 over the network 106. The methods 200 and 300 discussed above further enable the user 112a to create new events on the client 102b and synchronize those events, and an index of those events, with the server device 150 and the client 102a. Thus the user 112a can create events on multiple clients at multiple locations and search all events from any one of the multiple clients or multiple locations.

For example, the user 112a can receive an email while at home on the client 102a. This generates an event on the client 102a according to the method 200. According to the method 300, this event may then be sent to the server device 150 and further processed on the server device 150 according to the method 300. The user 112a can then travel to work and look at a web page on the client 102b. This similarly generates an event according to the method 200. The event corresponding to looking at the web page can also be sent to the server device 150 according to the method 300 and processed on the server device 150 in accordance with the method 300. The client 102b can also receive from the server device 150 the event corresponding to the sending of the email on the client 102a according to the method 300.

The user 112a can now travel to an airport and access the network 106 over a device configured to allow network access. The user 112a can utilize the network search engine 170 to conduct searches that will encompass both the email sent while on the client 102a and the web page viewed on the client 102b. The user can then return home to the client 102a and according to the method 300, the client 102a can receive and process the event corresponding to the web page viewed on the client 102b from the server device 150.

The index 142 on the client 102a, an index on the client 102b, and the index 192 on the server device 150, according to the example above, can now all support searches covering all of the events generated by the user 112a at various locations and on various clients.

While the above description contains many specifics, these specifics should not be construed as limitations on the scope of the invention, but merely as exemplifications of the disclosed embodiments. Those skilled in the art will envision many other possible variations that are within the scope of the invention.

The invention claimed is:

1. A computer-implemented method for synchronizing indexes of different devices, comprising:
   receiving in a second device a first event from a first device, the first event being captured in the first device and associated with a first term of a first article, the first event being indexed and associated with the first term of the first article in a first index of the first device;
   indexing the first event in a second index of the second device with the same first term of the first article with which the first event is indexed in the first index, wherein the first device comprises a first client computer and the first index is located on the first client computer, and wherein the second device comprises a second client computer and the second index is located on the second client computer;
   capturing a second event in the second device, the second event being associated with a second term of a second article;
   indexing the second event in the second index of the second device with the second term of the second article; and
   transmitting the second event to the first device to be indexed in the first index of the first device with the same second term of the second article with which the second event is indexed in the second index.

2. The computer-implemented method of claim 1, wherein at least one of the first term of the first article and the second term of the second article is associated with a plurality of events IDs, the plurality of event IDs associated with a plurality of events.

3. The computer-implemented method of claim 1, wherein the first event is stored in a queue.

4. The computer-implemented method of claim 1, wherein the first event is stored in a database.

5. The computer-implemented method of claim 1, further comprising:
monitoring system resources; and
receiving the second event by the second device from a queue when a resource level of the system resources is above a desired level.

6. The computer-implemented method of claim 5, wherein monitoring the system resources comprises monitoring available memory on the first device.

7. The computer-implemented method of claim 5, wherein monitoring the system resources comprises monitoring available memory on the second device.

8. The computer-implemented method of claim 5, wherein monitoring the system resources comprises monitoring bandwidth, network latency, jitter, or cost.

9. The computer-implemented method of claim 5, wherein monitoring the system resources comprises monitoring server activity.

10. The computer-implemented method of claim 5, wherein monitoring the system resources comprises monitoring client activity.

11. The computer-implemented method of claim 5, further comprising:
holding the second event in the queue when the system resources are below a threshold value.

12. The computer-implemented method 5, wherein the second event is not accepted by the second device when the system resources are below the desired level.

13. The computer-implemented method of claim 1, wherein at least one of the first index and the second index is encrypted.

14. The computer-implemented method of claim 1, wherein at least one of the first index and the second index is searchable over a network.

15. A computer-readable storage medium containing executable program code for synchronizing indexes of different devices, comprising:
program code for receiving in a second device a first event from a first device, the first event being captured in the first device and associated with a first term of a first article, the first event being indexed and associated with the first term of the first article in a first index of the first device;
program code for indexing the first event in a second index of the second device with the same first term of the first article with which the first event is indexed in the first index, wherein the first device comprises a first client computer and the first index is located on the first client computer, and wherein the second device comprises a second client computer and the second index is located on the second client computer;
program code for capturing a second event in the second device, the second event being associated with a second term of a second article;
program code for indexing the second event in the second index of the second device with the second term of the second article; and
program code for transmitting the second event to the first device to be indexed in the first index of the first device with the same second term of the second article with which the second event is indexed in the second index.

16. The computer-readable storage medium of claim 15, wherein at least one of the first term of the first article and the second term of the second article is associated with a plurality of events IDs, the plurality of event IDs associated with a plurality of events.

17. The computer-readable storage medium of claim 15, wherein at least one of the first term of the first article and the second term of the second article is stored in a queue.

18. The computer-readable storage medium of claim 15, wherein at least one of the first term of the first article and the second term of the second article is stored in a database.

19. The computer-readable storage medium of claim 15, further comprising:
program code for monitoring system resources; and
program code for receiving the second event by the second device from a queue when a resource level of the system resources is above a desired level.

20. The computer-readable storage medium of claim 19, wherein monitoring the system resources comprises monitoring available memory on the first device.

21. The computer-readable storage medium of claim 19, wherein monitoring the system resources comprises monitoring available memory on the second device.

22. The computer-readable storage medium of claim 19, wherein monitoring the system resources comprises monitoring bandwidth, network latency, jitter, or cost.

23. The computer-readable storage medium of claim 19, wherein monitoring the system resources comprises monitoring server activity.

24. The computer-readable storage medium of claim 19, further comprising:
program code for holding the second event in the queue when the system resources are below a threshold value.

25. The computer-readable storage medium of claim 15, wherein at least one of the first index and the second index is encrypted.

26. The computer-readable storage medium of claim 15, wherein at least one of the first index and the second index is searchable over a network.

27. A computer-implemented method for synchronizing indexes of different devices, comprising:
capturing, by a first device, a first event, the first event comprising first event data;
assigning, by the first device, a first event ID to the first event;
updating, by the first device, a first index by indexing the first event ID with a first term related to the first event, the first index comprising a plurality of terms associated with a plurality of events;
storing, by the first device, the first event in a first repository;
retrieving, by the first device, the first event from the first repository;
sending, by the first device, the first event to a second device;
receiving, by the second device, the first event as a new first event, the new first event comprising the first event data;
generating, by the second device, and assigning a new first event ID to the new first event;
updating, by the second device, a second index by indexing the new first event ID with the same first term with which the first event ID is indexed in the first index, the second index comprising a plurality of terms associated with a plurality of events;
storing, by the second device, the new first event in a second repository, wherein the first device comprises a first client computer and the first index is located on the first client computer, and wherein the second device comprises a second client computer and the second index is located on the second client computer;

capturing, by the second device, a second event, the second event comprising second event data;

assigning, by the second device, a second event ID to the second event;

updating, by the second device, the second index by indexing the second event ID with a second term related to the second event;

storing, by the second device, the second event in the second repository;

retrieving, by the second device, the second event from the second repository;

sending, by the second device, the second event to the first device;

receiving, by the first device, the second event as a new second event;

generating, by the first device, and assigning a new second event ID to the new second event;

updating, by the first device, the first index by indexing the new second event ID with the same second term with which the second event ID is indexed in the second index; and storing, by the first device, the new second event in the first repository.

28. A computer system for synchronizing indexes of different devices, comprising:

means for receiving in a second device a first event from a first device, the first event being captured in the first device and associated with a first term of a first article, the first event being indexed and associated with the first term of the first article in a first index of the first device;

means for indexing the first event in a second index of the second device with the same first term of the first article with which the first event is indexed in the first index, wherein the first device comprises a first client computer and the first index is located on the first client computer, and wherein the second device comprises a second client computer and the second index is located on the second client computer;

means for capturing a second event in the second device, the second event being associated with a second term of a second article;

means for indexing the second event in the second index of the second device with the second term of the second article; and means for transmitting the second event to the first device to be indexed in the first index of the first device with the same second term of the second article with which the second event is indexed in the second index.

* * * * *

UNITED STATES PATENT AND TRADEMARK OFFICE
CERTIFICATE OF CORRECTION

| | | |
|---|---|---|
| PATENT NO. | : 7,581,227 B1 | Page 1 of 1 |
| APPLICATION NO. | : 10/814952 | |
| DATED | : August 25, 2009 | |
| INVENTOR(S) | : Stephen R. Lawrence et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 787 days.

should read (*) Notice: Subject to any disclaimer, the term of this patent is extended or adjusted under 35 U.S.C. 154(b) by 1,456 days.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,581,227 B1  Page 1 of 1
APPLICATION NO. : 10/814952
DATED : August 25, 2009
INVENTOR(S) : Lawrence et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2125 days.

Signed and Sealed this

Fourteenth Day of September, 2010

David J. Kappos
*Director of the United States Patent and Trademark Office*